(12) United States Patent
Shaw et al.

(10) Patent No.: US 8,768,574 B1
(45) Date of Patent: Jul. 1, 2014

(54) PEDESTRIAN PROTECTION VEHICLE HOOD HINGE ASSEMBLY

(71) Applicant: Ventra Group, Inc., Bradford (CA)

(72) Inventors: David W. Shaw, Richmond Hill (CA); Joaquin Hung, Markham (CA); Brad Patzer, Barrie (CA); Simar Sodhi, Bradford (CA); Bruce Macnaughton, North York (CA); Rick Kalaska, Newmarket (CA)

( * ) Notice: Subject to any disclaimer, the term of this patent is extended or adjusted under 35 U.S.C. 154(b) by 0 days.

(21) Appl. No.: 13/774,680

(22) Filed: Feb. 22, 2013

(51) Int. Cl.
  *B62D 25/10* (2006.01)
  *B62D 25/12* (2006.01)
  *B60R 21/36* (2011.01)

(52) U.S. Cl.
  CPC ............ *B62D 25/105* (2013.01); *B62D 25/12* (2013.01); *B60R 21/36* (2013.01)
  USPC ................... 701/45; 180/274; 180/69.21

(58) Field of Classification Search
  CPC ...... B62D 25/10; B62D 25/105; B62D 25/12; B60K 28/10; E05D 3/00; E05D 3/06; E05D 3/14; E05D 3/145; B60R 21/34; B60R 21/38
  USPC ............. 701/45–47, 36, 32.2; 180/274, 69.21; 296/187.04
  See application file for complete search history.

(56) References Cited

U.S. PATENT DOCUMENTS

| | | |
|---|---|---|
| 2,000,172 A | 5/1935 | Hanson |
| 5,687,453 A | 11/1997 | Megregian et al. |
| 5,765,895 A | 6/1998 | Rose et al. |
| 6,217,108 B1 | 4/2001 | Sasaki |
| 6,237,992 B1 | 5/2001 | Howard |
| 6,257,657 B1 | 7/2001 | Sasaki |
| 6,345,679 B1 | 2/2002 | Sasaki |
| 6,554,093 B2 | 4/2003 | Sasaki et al. |
| 6,712,169 B2 | 3/2004 | Ryan et al. |
| 6,755,268 B1 | 6/2004 | Polz et al. |
| 6,934,999 B2 | 8/2005 | Kreth et al. |
| 6,953,220 B2 | 10/2005 | Takehara |
| 7,000,720 B2 | 2/2006 | Polz et al. |
| 7,089,626 B2 | 8/2006 | Alexander |
| 7,159,685 B2 | 1/2007 | Knight-Newbury et al. |
| 7,207,406 B1 | 4/2007 | Polz et al. |
| 7,231,995 B1 | 6/2007 | Polz et al. |
| 7,232,178 B2 | 6/2007 | Neal et al. |

(Continued)

FOREIGN PATENT DOCUMENTS

| | | |
|---|---|---|
| DE | 102007055915 A1 | 7/2008 |
| EP | 1412601 B1 | 6/2005 |

(Continued)

*Primary Examiner* — Richard Camby (57) ABSTRACT

A vehicle hood hinge assembly comprises a first hinge member; a second hinge member; a vehicle hood mount for connecting the vehicle hood member to the second hinge member, the vehicle hood mount being movably connected to the second hinge member for movement relative to the second hinge member between an operating position and an elevated position; a releasable lock for releasably locking the vehicle hood mount to the second hinge member in the operating position; a driving member movably connected to the first hinge member on the vehicle body; and an actuator for receiving an impact detection signal and, in response to the impact detection signal, configured to move the driving member so as to release the releasable lock and move vehicle hood mount from the operating position to the elevated position.

30 Claims, 6 Drawing Sheets

(56) References Cited

U.S. PATENT DOCUMENTS

| | | |
|---|---|---|
| 7,303,040 B2 | 12/2007 | Green et al. |
| 7,399,028 B1 | 7/2008 | Castillo et al. |
| 7,413,049 B2 | 8/2008 | Schramm et al. |
| 7,497,508 B2 | 3/2009 | Wallman et al. |
| 7,537,073 B2 | 5/2009 | Kalliske et al. |
| 7,537,272 B2 | 5/2009 | Hirata et al. |
| 7,546,663 B2 | 6/2009 | Duffy |
| 7,559,398 B2 | 7/2009 | Karlsson |
| 7,575,273 B2 | 8/2009 | Wallman et al. |
| 7,594,555 B2 | 9/2009 | Lutter et al. |
| 7,596,833 B2 | 10/2009 | Erwin |
| 7,597,166 B2 | 10/2009 | Parks |
| 7,637,344 B2 * | 12/2009 | Park .............................. 180/274 |
| 7,690,465 B2 | 4/2010 | Hirata |
| 7,690,722 B2 | 4/2010 | Boggess |
| 7,836,996 B2 | 11/2010 | Kitte et al. |
| 7,931,111 B2 | 4/2011 | Kim et al. |
| 7,934,293 B2 | 5/2011 | Kalargeros |
| 7,975,797 B2 | 7/2011 | Yusas et al. |
| 8,052,198 B2 | 11/2011 | Seksaria et al. |
| 8,069,943 B2 | 12/2011 | Takahashi |
| 8,398,125 B2 | 3/2013 | Takahashi et al. |
| 2004/0232729 A1 | 11/2004 | Kreth et al. |
| 2006/0291072 A1 | 12/2006 | Hoshi |
| 2008/0174124 A1 | 7/2008 | Takahashi et al. |
| 2010/0005628 A1 | 1/2010 | Jung |

FOREIGN PATENT DOCUMENTS

| | | |
|---|---|---|
| EP | 1302388 B1 | 1/2006 |
| EP | 1536991 B1 | 1/2006 |
| EP | 1736380 A1 | 12/2006 |
| EP | 1759937 A2 | 3/2007 |
| EP | 1604874 B1 | 4/2007 |
| EP | 1818224 A1 | 8/2007 |
| FR | 2910871 A1 | 7/2008 |
| GB | 2410924 A | 8/2005 |
| JP | 2005-59799 A | 3/2005 |
| JP | 2009-45978 A | 3/2009 |

* cited by examiner

PEDESTRIAN PROTECTION VEHICLE HOOD HINGE ASSEMBLY

BACKGROUND

1. Field

The present disclosure relates to a hinge assembly. More specifically, the present application provides illustrated embodiments of the present disclosure, including those relating to a hinge assembly for use, for example, in a motor vehicle.

2. Description of Related Art

Vehicle hood hinges include one hinge member connected to a vehicle body and the other hinge member connected to a vehicle hood member. A pivot or hinge pin pivotally connects these two hinge members to one another for opening and closing movements of the vehicle hood member.

In the event of a pedestrian crash (with the vehicle), the head of the pedestrian may be struck by a top surface of the vehicle hood member. This impact of the pedestrian's head against the hood may result in a serious brain injury of the pedestrian. Such a serious head injury may occur, for example, when there is an insufficient clearance between the vehicle hood member and its rigid/stiff underlying components. Maintaining a sufficient gap between the vehicle hood member and its underlying components that allows for the pedestrian's head to have a controlled deceleration may often be difficult given the vehicle design constraints, such as aerodynamics and styling.

Examples of known mechanisms for raising the vehicle hood are shown in U.S. Pat. Nos. 7,303,040; 7,413,049; 7,931,111; 7,975,797; and 8,069,943.

SUMMARY

In one embodiment of the present disclosure, an assembly to pivotally connect a vehicle hood member to a vehicle body for raising and lowering movement about a horizontal pivot axis between a closed position and an open position is provided. The assembly includes a first hinge member for mounting to the vehicle body; a second hinge member for mounting to the vehicle hood member; a vehicle hood mount for connecting the vehicle hood member to the second hinge member, the vehicle hood mount being movably connected to the second hinge member for movement relative to the second hinge member between an operating position and an elevated position; a releasable lock for releasably locking the vehicle hood mount to the second hinge member in the operating position such that the second hinge member and the vehicle hood mount move together for the raising and lowering movements of the vehicle hood member between the open and closed positions; a driving member movably connected to the first hinge member on the vehicle body; and an actuator for receiving an impact detection signal and, in response to the impact detection signal, configured to move the driving member so as to release the releasable lock and move vehicle hood mount from the operating position to the elevated position. The releasable lock is movable to a released position to permit the vehicle hood mount to move relative to the second hinge member between the operating and elevated positions.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
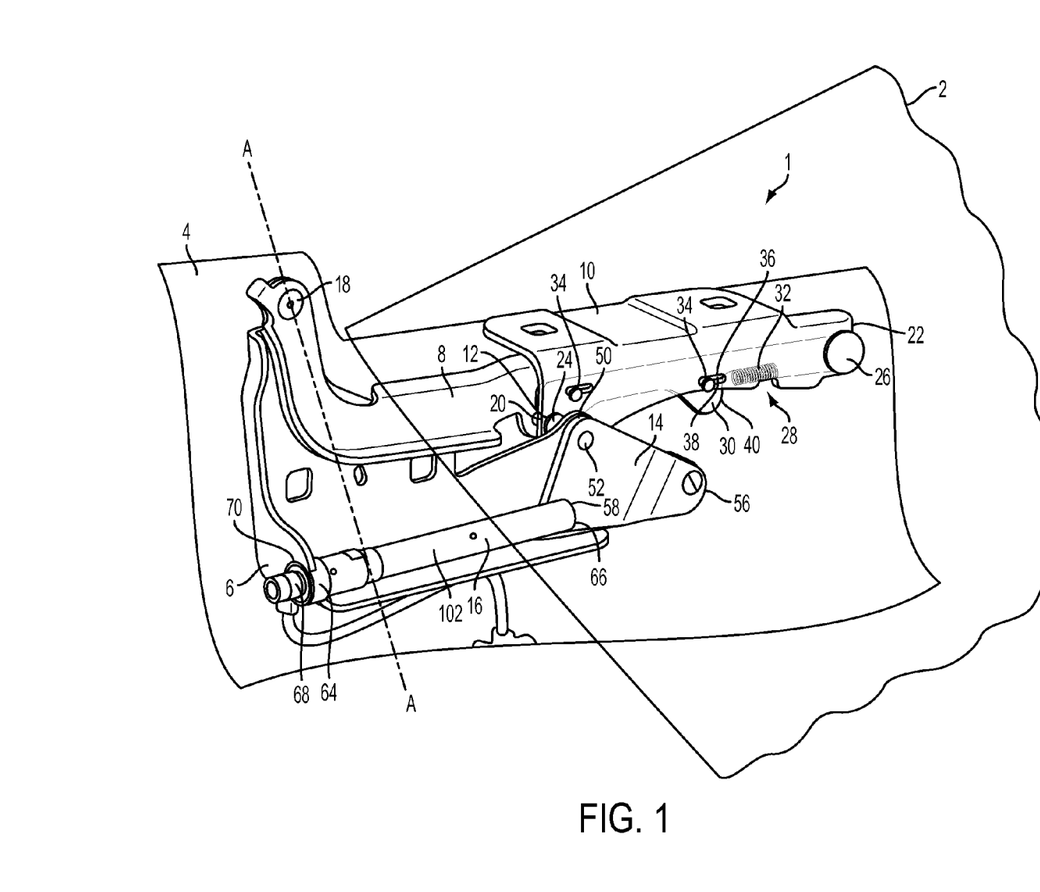
FIG. 1 shows a perspective view of an exemplary vehicle hood hinge assembly in accordance with an embodiment of the present disclosure.
Figure 2:
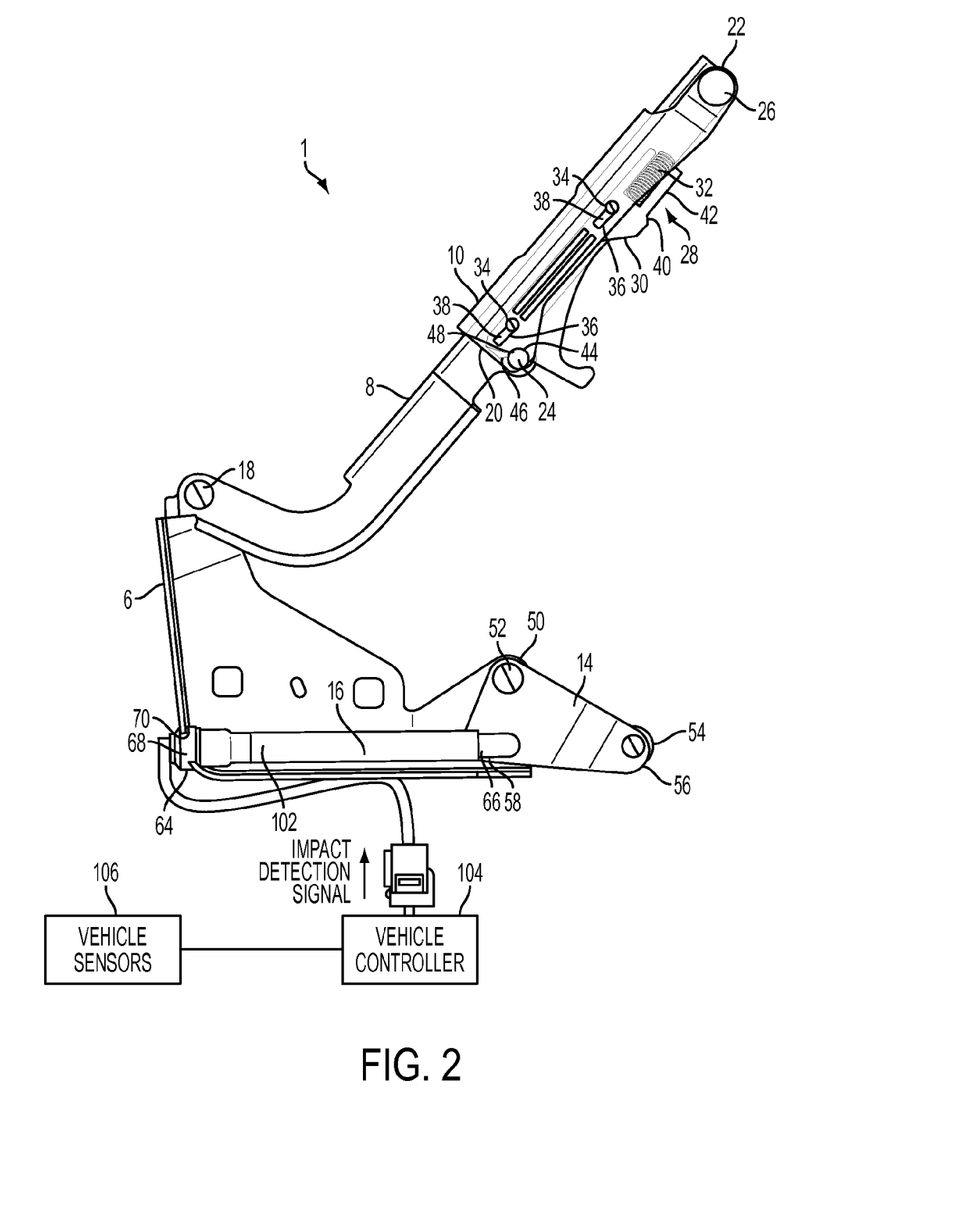
FIG. 2 shows another view of the exemplary vehicle hood hinge assembly shown in FIG. 1, where a vehicle hood mount is in a normal operating position.
Figure 3:
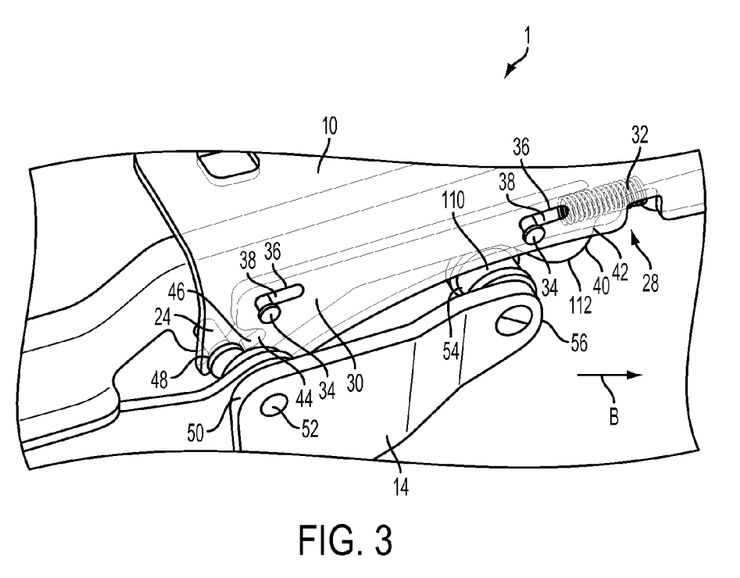
FIG. 3 shows an exploded view of a releasable lock and a driving member of the vehicle hood hinge assembly in accordance with an embodiment of the present disclosure.

FIG. 1 shows an exemplary assembly 1 to pivotally connect a vehicle hood member 2 to a vehicle body 4 for lowering and raising movement about a horizontal pivot axis A-A between a closed position (as shown in FIG. 1) and an open position (as shown in FIG. 2).

The assembly 1 includes a first hinge member 6 for mounting to the vehicle body 4, a second hinge member 8 for mounting to the vehicle hood member 2, and a vehicle hood mount 10 for connecting the vehicle hood member 2 to the second hinge member 8. A releasable lock 12 is provided for releasably locking the vehicle hood mount 10 to the second hinge member 8 in an operating position such that the second hinge member 8 and the vehicle hood mount 10 move together for the raising and lowering movements of the vehicle hood member 2 between the open and closed positions. A driving member 14 is movably connected to the first hinge member 6 on the vehicle body 4. An actuator 16 receives an impact detection signal and, in response to the impact detection signal, moves the driving member 14 so as to release the releasable lock 12 and move vehicle hood mount 10 from the operating position to an elevated position.

The open and closed positions refer to the conventional movements of the hood member 2 about the axis A-A where the front end of the hood member 2 is raised to pivot the hood member 2 rearwardly and to permit access to the compartment beneath the hood member 2 (usually the engine compartment, although in rear-mounted engine vehicles the front compartment may be a storage compartment), and pivoted down and forwardly to close the compartment beneath the hood member 2. The operating position refers to the position of the hood mount 10 relative to the second hinge member 8, and specifically the position where they are fixed together so they move together as a unit to move the hood member 2 between the open and closed positions. The elevated position refers to the position of the hood mount 10 relative to the second hinge member 8, and the first hinge member 6 and vehicle body 4 as well, in which the hood mount 10 is raised up to elevate the rear/proximal end of the hood member 2. Thus, the elevated position is not the same as the normal open position (compare FIGS. 2 and 4). Instead, it is a slightly open/elevated condition at the rear/proximal end of the hood member 2 for creating space between the hood member 2 and body 4 to better handle a pedestrian impact, while the front/distal end may remain down and held by the latch that normally keeps it in the closed position. Thus, because the elevated position raises the rear/proximal end, the movement has a forward and upward pivoting component, as opposed to the normal opening movement where the front/distal end is raised so that hood member 2 has a rearward and upward pivoting component.

As used herein, any references to pivoting action of the hood member 2 or components may include simple pivoting (i.e., pivot about an axis, compound movements that combine a simple pivot with other motions (e.g., pivoting and linear) or multiple pivots (e.g., multiple bar linkages), or other mechanisms that provide a general overall pivoting style of motion.

Vehicle body mounting holes on the first hinge member 6 are used for mounting the first hinge member 6 to the vehicle body. Vehicle hood mounting holes on the vehicle hood mount 10 are used for mounting the vehicle hood mount 10 to the vehicle hood member 2. The vehicle hood mount 10 and the second hinge member 8 each have mounting holes that correspond to each other and that are used for mounting the vehicle hood mount 10 to the second hinge member 8.

The assembly 1 hingedly connects the vehicle hood member 2 to the vehicle body 4 for permitting the pivoting of the vehicle hood member 2 about the horizontal axis A-A to access an inner space of the vehicle. The vehicle hood member 2 is a movable panel connected to the vehicle body 4. A pivot pin 18 is pivotally connected to the first hinge member 6 and/or the second hinge member 8 to provide pivotal movement of the vehicle hood member 2 about the horizontal pivot axis A-A between the closed position and the open position.

Figure 4:
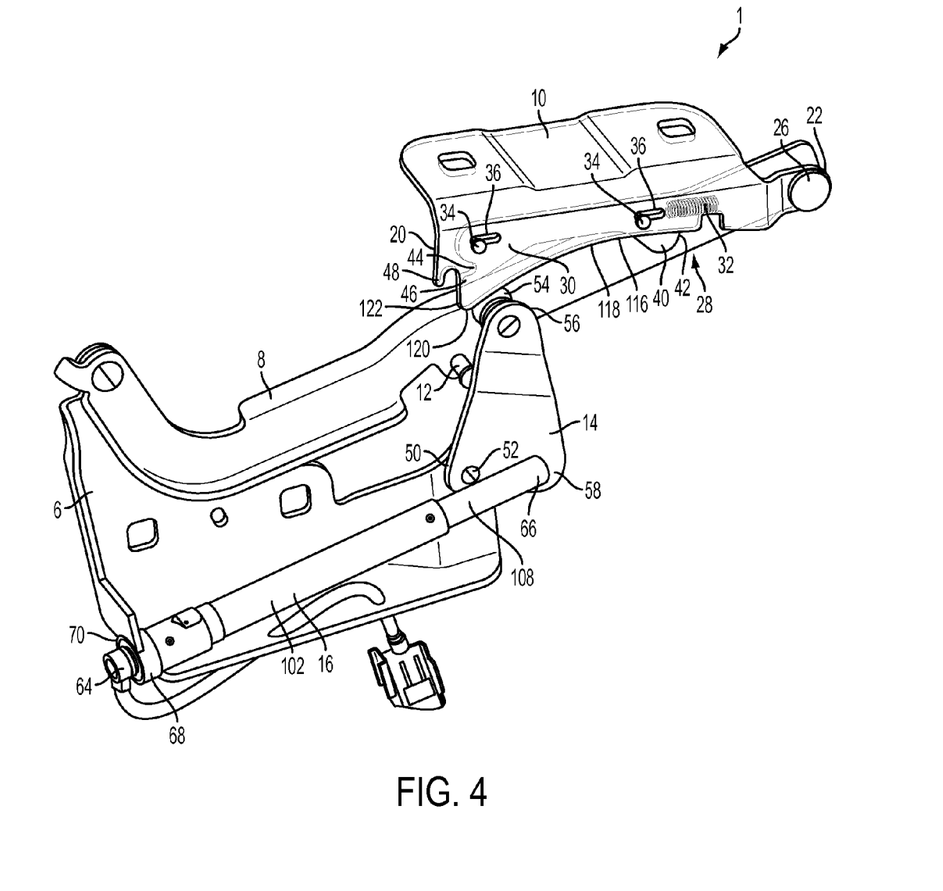
FIG. 4 shows another view of the exemplary vehicle hood hinge assembly shown in FIG. 1, where the vehicle hood mount is in an elevated position.

The vehicle hood mount 10 is movably connected to the second hinge member 8 for movement relative to the second hinge member 8 between the operating position (as shown in FIGS. 1 and 2) and the elevated position (as shown in FIG. 4).

The vehicle hood mount 10 is releasably connected to the second hinge member 8 at a first end 20 thereof. The vehicle hood mount 10 is pivotally connected to the second hinge member 8 at a second end 22 thereof. A pivot pin 26 pivotally connects the vehicle hood mount 10 and the second hinge member 8 to one another at the second end 22. The pivot pin 26 is constructed and arranged to provide movement of vehicle hood mount 10 relative to the second hinge member 8 between the operating position and the elevated position. In one embodiment, the second end 22 is positioned near a forward/distal end of the vehicle hood member 2 (or the vehicle) and the first end 20 is positioned rearward/proximal of the second end 22.

When the vehicle hood mount 10 in the operating position, the vehicle hood mount 10 and the second hinge member 8 move together for raising and lowering movements of the vehicle hood member 2 between the open and closed positions. When the vehicle hood mount 10 in the operating position, the vehicle hood member 2 may be at the open position, at the closed position, or any other position between the open and closed positions. For example, the vehicle hood mount 10 and the second hinge member 8 may be moved together for raising movement of the vehicle hood member 2 to the open position as shown in FIG. 2. The vehicle hood mount 10 and the second hinge member 8 may be moved together for lowering movement of the vehicle hood member 2 to the closed position as shown in FIG. 1.

As will be clear from the discussion below, the vehicle hood mount 10 is moved from the operating position (as shown in FIG. 1) to the elevated position (as shown in FIG. 4) first by disengaging the vehicle hood mount 10 from the second hinge member 8 at its first end 20 and then rotating/pivoting the vehicle hood mount 10 about the pivot pin 26, positioned at its second end 22, to the elevated position.

The releasable lock 12 is movable to a released position to permit the vehicle hood mount 10 to move relative to the second hinge member 8 between the operating and elevated positions. In one embodiment, the releasable lock 12 may include the locking pin 24 and a sliding latch mechanism 28.

In the illustrated embodiment, as shown in FIGS. 1-4, the locking pin 24 is disposed on the second hinge member 8. The locking pin 24 projects laterally outwardly from the second hinge member 8 (toward the vehicle hood mount 10). In one embodiment, the locking pin 24 has a raised portion at the free end (away from the second hinge member 8). It is appreciated, however that the locking pin member is but one example of different shapes, configurations and/or constructions of the locking structures that can be provided.

The sliding latch mechanism 28 ensures that the vehicle hood mount 10 is connected to the second hinge member 8 when the vehicle hood mount 10 is in the operating position. That is, the sliding latch mechanism 28 ensures that the vehicle hood mount 10 and the second hinge member 8 move together as a single component under normal vehicle hood member opening/closing operations.

The sliding latch mechanism 28 includes a latch member 30 and a bias member 32. The latch member 30 is slidably connected to the vehicle hood mount 10 by using pin members 34. In one embodiment, both the latch member 30 and the vehicle hood mount 10 have pin member receiving slots 36, 38, respectively, for receiving the pin members 34 therein. The pin receiving slots 36 disposed on the latch member 30 have generally elongated configuration to provide a sliding movement of the latch member 30 with respect to the vehicle hood mount 10. In one embodiment, the bias member 32 is a spring that is constructed and arranged to bias the latch member 30 of the releasable lock 12 toward the lock position.

The latch member 30 includes a cam portion 40 disposed at a first end 42 thereof and a locking pin engaging portion 44 shaped as a recess disposed at a second end 46, opposite to the first end 42, thereof.

The locking pin engaging portion 44 is constructed and arranged to be engaged with the locking pin 24 when the vehicle hood mount 10 is in its operating position. It is contemplated that the locking pin engaging portion may have any shape, configuration, and/or construction as long as it lockingly engages with the locking pin provided on the second hinge member. For example, instead of a C-shaped recess, a surface that just engages the bottom of the pin 24 may be used.

In one embodiment, the latch member 30 of the releasable lock 12 is linearly movable between the lock position and the release position. In one embodiment, the latch member 30 of the releasable lock 12 moves linearly to disengage the locking pin engaging portion 44 disposed on the latch member 30 from the locking pin 24. The linear, elongated shapes of slots 36, 38 guide this linear movement.

It should be appreciated that the releasable lock described above is just one example of the types of arrangements that can be provided. While the present application is described using pin and two lock engaging regions, it is, however, contemplated that any number (e.g., even only one pin and lock engaging region) of lock engaging structures can be provided to receive the locking structures for locking the vehicle hood mount to the second hinge member. Other arrangements, such as ratcheting arrangements or detent arrangements may also be provided. Other locking arrangements will be readily apparent to those skilled in the art, and the present application contemplates a broad range of possibilities for such locking mechanism.

The vehicle hood mount 10 also may include a locking pin engaging portion 48. The locking pin engaging portion 48 of the vehicle hood mount 10 is engaged with the pin member 24 when the vehicle hood mount 10 is in its operating position. This optimal feature helps to limit movement of the hood mount 10 as it is moved back to the operating position.

The vehicle hood mount 10 includes a cam surface 116 disposed on a bottom or lower end portion 118 thereof that ends with a downwardly protruding portion 120. The downwardly protruding portion 120 is disposed at a rearward/proximal end 122 of the bottom or lower end portion 118.

The driving member 14 is pivotably connected to the first hinge member 6 (on the vehicle body 4) at a first end 50 thereof. A pivot or hinge pin 52 pivotally connects the driving member 14 and the first hinge member 6 to one another for providing a pivotal movement of the driving member 14 about the hinge or pivot pin 52.

The driving member 14 includes a cam engaging member 54 positioned at a second end 56 thereof. As will be clear from the discussion below, the cam engaging member 54 is constructed and arranged to engage with the cam portion 40 of the latch member 30 so as to release the releasable lock 12 and to permit the vehicle hood mount 10 to move relative to the second hinge member 8 between the operating and elevated positions. In one embodiment, the cam engaging member 54 may be in the form of a roller member. The driving member 14 is movably or pivotably connected to the actuator 16 at a third end 58 thereof.

The actuator 16 is movably connected to the first hinge member 6 at its first end 64 and is connected to the driving member 14 at its second end 66. At its first end 64, a portion 68 of the actuator 16 is received in a groove 70 formed on the first hinge member 6 (on the vehicle body 4). The engagement between the actuator portion 68 and the groove 70 is constructed and arranged to permit a rotational movement of the actuator 16 about this end 64. In one embodiment, the groove 70 may be constructed and arranged to provide a limited rotational movement of the actuator 16 about its first end 64.

In one embodiment, the actuator 16 is horizontally mounted. In one embodiment, the actuator 16 is a pyrotechnic actuator having a cylinder-piston arrangement. The piston is generally contained with the cylinder and is extended/moved by a detonation of a pyrotechnic or explosive charge. This ignition or detonation of the pyrotechnic or explosive charge causes the rapid expansion of gases in the cylinder, which results in extremely high pressure within the cylinder. This high pressured gases move the piston to a desired stroke. The assembly 1 of the present application allows a pyrotechnic charge to be mounted to the first hinge member 6 in a horizontal configuration.

It is contemplated that the actuator may have any other configuration, and/or construction as long as it, in response to the impact detection signal, is configured to move the driving member 14 so as to release the releasable lock 12 and move vehicle hood mount 10 from the operating position to the elevated position. For example, the actuator may be mechanical, pneumatic, hydraulic, or electrical actuator that moves the driving member 14 from an initial position to a subsequent position in response to the received impact detection signal.

Impact detection signal may be generated by a controller 104 of the vehicle. The vehicle controller 104 may be configured to receive signals or data from one or more sensors 106 positioned at the front of the vehicle. These sensors 106 may include a pressure sensor that is configured to detect pressure produced by the impact with a pedestrian and/or a deformation sensor that is configured to detect deformation produced by the impact with a pedestrian. For example, such pressure sensors may use any type of pressure sensing technologies, for example, but not limited to, piezoresistive strain gauge, capacitive, electromagnetic, piezoelectric, optical, and potentiometric. Such pressure or deformation sensors may be placed on the engine or vehicle hood member and/or vehicle front bumper. The vehicle controller 104 may also receive signals or data from a velocity sensor, an acceleration sensor, and/or a vehicle brake system located in the vehicle and the controller may use these additional signals and/or data to generate the impact detection signal. Such sensors are well-known and used for triggering other safety devices, such as air bags.

The operation of the assembly 1 is shown and explained with respect to FIGS. 1-4.

Under normal hinge operation, a pivotal movement of the vehicle hood member 2 about the horizontal pivot axis A-A between the closed position and the open position is provided. As noted above, the pivot or hinge pin 18 pivotally connects the first hinge member and the second hinge members 6, 8 to one another for providing opening and closing movements of the vehicle hood member 2.

When the opening and closing movements of the vehicle hood member 2 are provided, the vehicle hood mount 10 is in its operating position. In this operating position, the vehicle hood mount 10 is releasably locked to the second hinge member 8 by the releasable lock 12 so that both the vehicle hood mount 10 and the second hinge member 8 move together for raising and lowering movements of the vehicle hood member between the open and closed positions. Specifically, in this vehicle hood mount operating position, the locking pin 24 disposed on the second hinge member 8 is received by both the locking pin engaging portion 44 disposed on the latch member 30 and the locking pin engaging portion 48 disposed on the vehicle hood mount 10. The locking pin engaging portion 44 disposed on the latch member 30 remains engaged with the locking pin 24 under the force of the bias member 32 to lock the vehicle hood mount 10 to the second hinge member 8. The locking engagement of the locking pin engaging portion 44 disposed on the latch member 30 and the locking pin 24 causes the locking pin engaging portion 48 disposed on the vehicle hood mount 10 to also remain engaged with the locking pin 24.

When the vehicle hood mount 10 is in its operating position and the vehicle hood member 2 is moved between its open and closed positions, the actuator 16 and the driving member 14 remain in their respective initial configurations. For example, the actuator 16 remains in a horizontal, initial configuration.

The vehicle controller 104 receives data from various vehicle sensors 106, analyzes the received data and generates the impact detection signal when a pedestrian crash with the vehicle is detected. The vehicle controller 104 sends the impact detection signal to the actuator 16.

In one embodiment, in response to the impact detection signal, at least a portion of the actuator 16 is configured to move outwardly, thereby pushing the driving member 14, and causing the driving member 14 to pivot about its first end 50.

Specifically, in response to the impact detection signal, a pyrotechnic (or explosive) charge stored in the cylinder 102 of the actuator 16 is ignited. This ignition or detonation of the pyrotechnic (or explosive) charge causes the rapid expansion of gases in the cylinder 102, which results in high pressure within the cylinder 102. These high pressured gases in the cylinder 102 move the piston 108 outwardly from the cylinder 102. As one end 66 of the piston 108 is connected to the driving member 14, the outward movement of the piston 108 from the cylinder 102 moves or pushes the driving member 14.

The continued operation of the pyrotechnic (or explosive) charge in the cylinder 102 also causes the actuator portion 68 to pivot or rotate in the groove 70 at its first end 64. The rotational movement of the actuator 16 about its first end 64 and the outwardly movement of the piston 108 from the cylinder 102 together provide a pivotal movement of the driving member about the pivot pin 52.

The pivotal movement of the driving member 14 about its first end 50 causes a roller member 54 disposed on the driving member 14 to release the releasable lock 12 to permit the vehicle hood mount 10 to move relative to the second hinge member 8 from the operating position.

Specifically, as the driving member 14 pivots about the pivot pin 52, surfaces 110 of the roller member 54 positioned at the third end 56 of the driving member 14 engages surfaces 112 of the cam member 40 disposed on the latch member 30. The camming action of the cam surfaces 110 and 112 initially forces the latch member 30 to move outwardly (forwardly in the direction of an arrow B) against the bias of the bias member 32 relative to the second hinge member 8 and the hood mount 10. As latch member 30 is linearly moved outwardly in the direction of the arrow B, the bias member 32 of the releasable lock 12 is compressed. Also, as latch member 30 is linearly moved outwardly in the direction of the arrow B, the locking pin engaging portion 44 disposed on the latch member 30 disengages from the locking pin 24. Once the locking pin engaging portion 44 is disengaged from the locking pin 24, continued pivotal movement of the driving member 14 by the actuator 16 contacts the roller member 54 against the cam surface 116 of the hood mount 10 to pivot it forwardly and upwardly about the pivot pin 26 into its elevated position. Thus, the outwardly movement of the actuator 16 is converted to vertical, upwardly motion of the vehicle hood mount 10.

The forwardly and upwardly movement of the vehicle hood mount 10 is controlled by the downwardly sloping camming surface 116 and the downwardly protruding portion 120 of the hood mount 10. That is, this configuration (i.e., the downwardly sloping camming surface 116 and the downwardly protruding portion 120) of the hood mount 10 keeps the hood mount 10 and the vehicle hood member 2 connected to the vehicle hood mount 10 from popping-up too high. In one embodiment, when the pyrotechnic charge in the actuator 16 is at the end of its stroke, the vehicle hood mount 10 and the vehicle hood member 2 connected to the vehicle hood mount 10 are lifted to a desired height so as to provide a desired clearance between the vehicle hood member and its underlying components.

Once deployed, the vehicle hood member 2 may be pushed down and the releasable lock 12 may be re-engaged, allowing the vehicle to be driven without the vehicle hood member 2 remaining in the deployed position (e.g., in case of a false deployment).

Specifically, when the vehicle hood member 2 and the vehicle hood mount 10 attached to the vehicle hood member 2 may be pushed downwardly, cam surface on the pin 24 engage cam surface on the locking pin engaging portion 44 disposed on the latch member 30. The camming action of these cam surfaces forces the latch member 30 outwardly in the direction of the arrow B, against the bias of the spring 32. As the latch member 30 is linearly moved outwardly, the spring 32 is compressed. Once the pin 24 passes over the cam surface on the locking pin engaging portion 44, it snaps into locking engagement with the locking pin engaging portion 44. The spring 32 moves the latch member 30 inwardly (that is opposite to the direction of arrow B) to the lock position to lock the vehicle hood mount 10 (and the vehicle hood member 2) to the second hinge member 8.

In one embodiment, when deployed, the main hinge pivot axis remains at the same height, allowing it to be located underneath areas of the vehicle other than the hood (i.e., partially covered by the A pillar).

Figure 5:
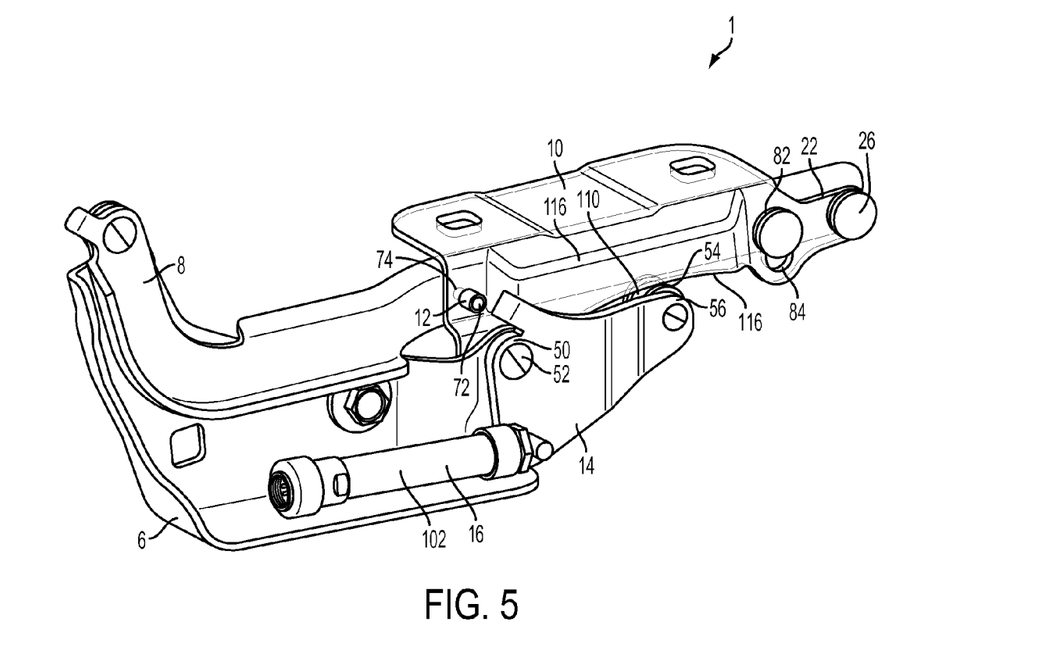
FIG. 5 shows a perspective view of an exemplary vehicle hood hinge assembly in accordance with another embodiment of the present disclosure.

FIG. 5 illustrates an alternative embodiment in accordance with various aspects of the present patent application. This embodiment is similar to the embodiments previously described with respect to FIGS. 1-4, except for the differences as will be noted below.

In the illustrated embodiment of FIG. 5, the releasable lock 12 includes a shear pin 72 disposed on the second hinge member 8. The shear pin 72 is constructed and arranged to engage with shear pin engaging portion 74 disposed on the vehicle hood mount 10 to lock the vehicle hood mount 10 to the second hinge member 8 in the operating position. In the illustrated embodiment, the shear pin engaging portion 74 may be in the form of an opening in which the shear pin 72 is received. This operating position of the vehicle hood mount 10 is illustrated in FIG. 5.

The operation of the assembly shown in FIG. 5 is similar to the operation of the assembly 1 in the previously described embodiments (FIGS. 1-4), except for the differences as will be noted below.

In one embodiment, in response to the impact detection signal, at least a portion of the actuator 16 is configured to move outwardly (in a horizontal direction), thereby pushing the driving member 14, and causing the driving member 14 to pivot about its first end 50.

The pivotal movement of the driving member 14 about its first end 50 causes a roller member 54 disposed on the driving member 14 to release the releasable lock 12 to permit the vehicle hood mount 10 to move relative to the second hinge member 8 from the operating position.

Specifically, as the driving member 14 pivots about the pivot pin 52, surfaces 110 of the roller member 54 positioned at the third end 56 of the driving member 14 engages with the cam surfaces 116 of the vehicle hood mount 10 and rides along the cam surface 116. The continued operation of the pyrotechnic (or explosive) charge in the cylinder 102 causes further pivotal movement of the driving member 14 and causes the roller member 54 of the driving member 14 to apply upwardly force against the vehicle hood mount 10. This upwardly exerted force on the vehicle hood mount 10 causes the shear pin engaging portion 74 to break off the shear pin 72 so as to enable the movement of the vehicle hood mount 10 from the operating position to the elevated position. In one embodiment, the shear pin engaging portion 74 is constructed and arranged to assist in shearing or breaking off the shear pin 72.

Once the shear pin 72 is sheared or broken by the shear pin engaging portion 74, the vehicle hood mount 10 is pivoted upwardly about the pivot pin 26 into its elevated position. Thus, the outwardly movement of the actuator 16 is converted to vertical, upwardly motion of the vehicle hood mount 10.

In other embodiments, the vehicle hood mount 10 is locked to the second hinge member 8 in the operating position by any other frangible fastening mechanisms, or other fastening mechanisms such as a threaded fastener, a bolt or a rivet that is constructed and arranged to shear or break off when stresses or forces are exerted thereon and thereby enable the movement of the vehicle hood mount 10 from the operating position to the elevated position. In one embodiment, the shear pin 72 and other alternative frangible fastening mechanisms discussed above are made from a plastic material or other frangible materials that are known to one skilled in the art.

As noted in the embodiments previously described with respect to FIGS. 1-4, the pivot pin 26 pivotally connects the vehicle hood mount 10 and the second hinge member 8 to one another at the second end 22 of the vehicle hood mount 10 so as to provide movement of vehicle hood mount 10 relative to the second hinge member 8 between the operating position and the elevated position. In the illustrated embodiment of FIG. 5, in addition to the pivot pin 26, a limiting pin 82 is positioned rearward/proximal of the second end 22 of the vehicle hood mount 10.

The movement of the limiting pin 82 is limited or controlled by an opening or a slot 84 disposed on the vehicle hood mount 10. The opening or slot 84 has a generally elongated configuration so as to provide a linear, vertical movement of the limiting pin 82 therein.

Once the shear pin 72 is sheared or broken off, the vehicle hood mount 10 is pivoted upwardly about the pivot pin 26 into its elevated position. The upwardly movement of the vehicle hood mount 10 is controlled by the elongated opening 84 disposed on the vehicle hood mount 10. The linear, elongated shape of opening or slot 84 guide the movement of the limiting pin 82 therein. That is, this configuration (i.e., limiting pin 82 disposed in the elongated opening 84) of the hood mount 10 keeps the hood mount 10 and the vehicle hood member 2 connected to the vehicle hood mount 10 from popping-up too high. In one embodiment, when the pyrotechnic charge in the actuator 16 is at the end of its stroke, the vehicle hood mount 10 and the vehicle hood member 2 connected to the vehicle hood mount 10 are lifted to a desired height so as to provide a desired clearance between the vehicle hood member and its underlying components.

Figure 6:
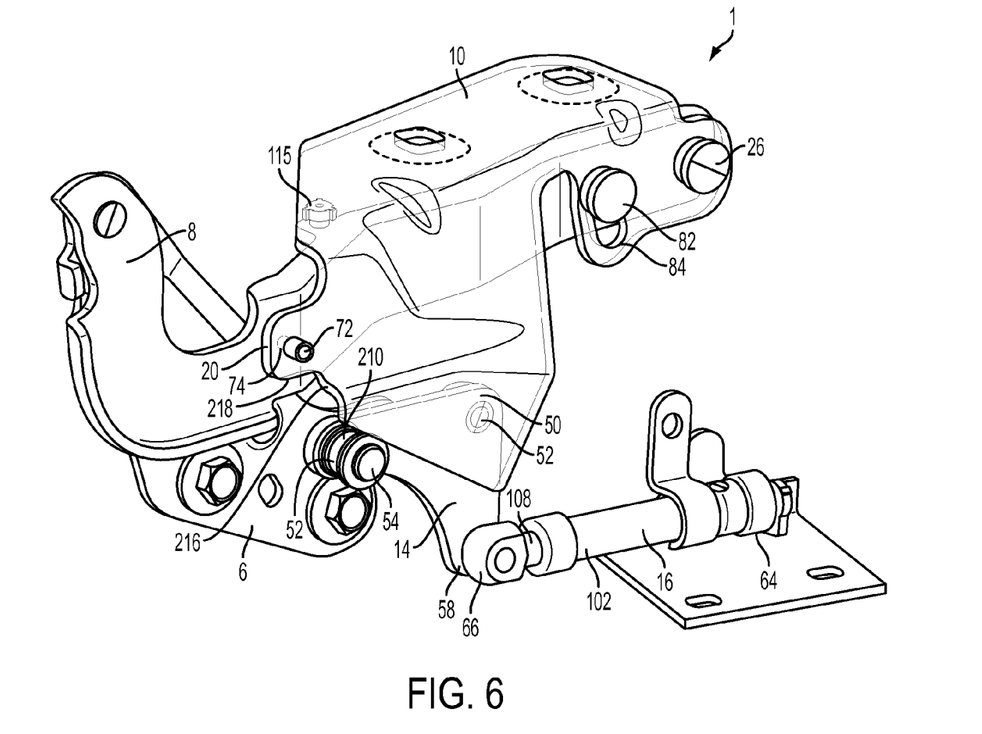
FIG. 6 shows a perspective view of an exemplary vehicle hood hinge assembly in accordance with yet another embodiment of the present disclosure.

FIG. 6 illustrates an alternative embodiment in accordance with various aspects of the present patent application. This embodiment is similar to the embodiments previously described with respect to FIGS. 1-4 and FIG. 5, except for the differences as will be noted below.

The vehicle hood mount 10 includes a cam surface 216 disposed near the first end 20 thereof. The driving member 14 is pivotably connected to the vehicle body 4 at the first end 50 thereof. The pivot or hinge pin 52 pivotally connects the driving member 14 and the hinge member to one another for providing a pivotal movement of the driving member 14 about the hinge or pivot pin 52.

The driving member 14 includes the cam engaging member or roller member 54 positioned at the second end 56 thereof. As will be clear from the discussion below, the cam engaging member 54 is constructed and arranged to release the releasable lock 12 and to permit the vehicle hood mount 10 to move relative to the second hinge member 8 between the operating and elevated positions. The driving member 14 is movably or pivotably connected to the actuator 16 at the third end 58 thereof. The actuator 16 is movably connected to a vehicle member at its first end 64 and is connected to the driving member 14 at its second end 66.

Similar to the embodiment previously described with respect to FIG. 5, the releasable lock 12 of FIG. 6 includes the shear pin 72 disposed on the second hinge member 8. The shear pin 72 is constructed and arranged to engage with shear pin engaging portion 74 disposed on the vehicle hood mount 10 to lock the vehicle hood mount 10 to the second hinge member 8 in the operating position. In the illustrated embodiment, the shear pin engaging portion 74 may be in the form of an opening. This operating position of the vehicle hood mount 10 is illustrated in FIG. 6.

The operation of the assembly 1 is shown and explained with respect to FIG. 6. The vehicle controller receives data from various vehicle sensors, analyzes the received data and generates the impact detection signal when a pedestrian crash with the vehicle is detected. The vehicle controller sends the impact detection signal to the actuator 16.

In one embodiment, in response to the impact detection signal, at least a portion of the actuator 16 is configured to move outwardly (in a horizontal direction), thereby pushing the driving member 14, and causing the driving member 14 to pivot about its first end 50.

Specifically, in response to the impact detection signal, a pyrotechnic (or explosive) charge stored in the cylinder 102 of the actuator 16 is ignited. This ignition or detonation of the pyrotechnic (or explosive) charge causes the rapid expansion of gases in the cylinder 102, which results in high pressure within the cylinder 102. These high pressured gases in the cylinder 102 move the piston 108 outwardly from the cylinder 102. As one end 66 of the piston 108 is connected to the driving member 14, the outward movement (in a horizontal direction) of the piston 108 from the cylinder 102 moves or pushes the driving member 14. The continued operation of the pyrotechnic (or explosive) charge in the cylinder 102 causes a pivotal movement of the driving member 14 about the pivot pin 52.

The pivotal movement of the driving member 14 about its first end 50 causes a roller member 54 disposed on the driving member 14 to release the releasable lock 12 to permit the vehicle hood mount 10 to move relative to the second hinge member 8 from the operating position.

Specifically, as the driving member 14 pivots about the pivot pin 52, surfaces 210 of the roller member 54 positioned at the third end 56 of the driving member 14 engages with the cam surface 216 of the hood mount 10 and rides along the cam surface 216 until the surfaces 210 of the roller member 54 are in engagement with portion 218 of the cam surface 216 of the vehicle hood mount 10. The continued operation of the pyrotechnic (or explosive) charge in the cylinder 102 causes further pivotal movement of the driving member 14 and causes the roller member 54 of the driving member 14 to apply upwardly force against the portion 218 of the cam surface 216 of the vehicle hood mount 10. This upwardly exerted force on the portion 218 of the cam surface 216 of the vehicle hood mount 10 causes the shear pin engaging portion 74 to break off the shear pin 72 so as to enable the movement of the vehicle hood mount 10 from the operating position to the elevated position. In one embodiment, the shear pin engaging portion 74 is constructed and arranged to assist in shearing or breaking off the shear pin 72.

Once the shear pin 72 is sheared or broken by the shear pin engaging portion 74, the vehicle hood mount 10 is pivoted upwardly about the pivot pin 26 into its elevated position. Thus, the outwardly movement of the actuator 16 is converted to vertical, upwardly motion of the vehicle hood mount 10.

Similar to the embodiment previously described with respect to FIG. 5, the illustrative embodiment of FIG. 6 includes a configuration in which the limiting pin 82 disposed in the elongated opening 84 so as to control the upwardly movement of the vehicle hood mount 10 and to keep the vehicle hood mount 10 (and the vehicle hood member 2 connected to the vehicle hood mount 10) from popping-up too high.

Also, in the illustrative embodiment of FIG. 6, a support member 115 is disposed on the second hinge member 8. The support member 115 is constructed and arranged to support the vehicle hood mount 10 when it is in its operating position.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. An assembly to pivotally connect a vehicle hood member to a vehicle body for raising and lowering movement about a horizontal pivot axis between a closed position and an open position, the assembly comprising:
    a first hinge member for mounting to the vehicle body;
    a second hinge member for mounting to the vehicle hood member;
    a vehicle hood mount for connecting the vehicle hood member to the second hinge member, the vehicle hood mount being movably connected to the second hinge member for movement relative to the second hinge member between an operating position and an elevated position;
    a releasable lock for releasably locking the vehicle hood mount to the second hinge member in the operating position such that the second hinge member and the vehicle hood mount move together for the raising and lowering movements of the vehicle hood member between the open and closed positions, the releasable lock being movable to a released position to permit the vehicle hood mount to move relative to the second hinge member between the operating and elevated positions;
    a driving member movably connected to the first hinge member on the vehicle body; and
    an actuator for receiving an impact detection signal and, in response to the impact detection signal, configured to move the driving member so as to release the releasable lock and move vehicle hood mount from the operating position to the elevated position.

2. The assembly of claim 1, wherein the vehicle hood mount is releasably connected to the second hinge member at a first end thereof and is pivotably connected to second hinge member at a second end thereof so as to provide the movement of the vehicle hood mount relative to the second hinge member between the operating position and the elevated position.

3. The assembly of claim 1, wherein the driving member is pivotably connected to the first hinge member at a first end thereof and is movably connected to the actuator at a second end thereof.

4. The assembly of claim 1, wherein the actuator is a pyrotechnic actuator.

5. The assembly of claim 3, wherein the releasable lock includes a latch member constructed and arranged to move from a lock position to a release position and a bias member constructed and arranged to bias the latch member toward the lock position.

6. The assembly of claim 5, wherein the releasable lock includes a locking pin disposed on the second hinge member, the locking pin being constructed and arranged to engage with locking pin engaging portion disposed on the latch member to lock the vehicle hood mount to the second hinge member.

7. The assembly of claim 6, wherein a pivotal movement of the driving member about its first end causes a roller member disposed on the driving member to engage with a portion of the latch member and move the latch member from the lock position to the release position.

8. The assembly of claim 1, wherein the releasable lock includes a shear pin disposed on the second hinge member, the shear pin being constructed and arranged to engage with shear pin engaging portion disposed on the vehicle hood mount to lock the vehicle hood mount to the second hinge member in the operating position.

9. The assembly of claim 8, wherein a pivotal movement of the driving member about its first end causes a portion of the vehicle hood mount to engage with and to break off a portion of the shear pin so as to enable the movement of the vehicle hood mount from the operating position to the elevated position.

10. The assembly of claim 8, wherein a pivotal movement of the driving member about its first end causes a roller member disposed on the driving member to engage with a portion of the vehicle hood mount and move the vehicle hood mount from the operating position to the elevated position.

11. The assembly of claim 10, wherein the shear pin is sheared off by the shear pin engaging portion during the movement of the vehicle hood mount from the operating position to the elevated position.

12. The assembly of claim 11, wherein the shear pin engaging portion is constructed and arranged to assist in shearing or breaking off the shear pin.

13. The assembly of claim 3, wherein the actuator is horizontally mounted.

14. The assembly of claim 13, wherein, in response to the impact detection signal, at least a portion of the actuator is configured to move outwardly, thereby pushing the driving member, and causing the driving member to pivot about its first end.

15. The assembly of claim 14, wherein a pivotal movement of the driving member about its first end causes a roller member disposed on the driving member to engage with and release the releasable lock so as to permit the vehicle hood mount move relative to the second hinge member from the operating position.

16. The assembly of claim 15, wherein continued operation of the actuator causes the driving member to pivot upwardly such that the roller member disposed thereon contacts the vehicle hood mount moving it to its elevated position, whereby the outwardly movement of the actuator is converted to vertical, upwardly motion of the vehicle hood mount.

17. An assembly to pivotally connect a vehicle hood member to a vehicle body for raising and lowering movement about a horizontal pivot axis between a closed position and an open position, the assembly being for use with an actuator for receiving an impact detection signal, the actuator being configured to, in response to the impact detection signal, to move in an actuating direction, the assembly comprising:
    a first hinge member for mounting to the vehicle body;
    a second hinge member for mounting to the vehicle hood member;
    a vehicle hood mount for connecting the vehicle hood member to the second hinge member, the vehicle hood mount being movably connected to the second hinge member for movement relative to the second hinge member between an operating position and an elevated position;
    a releasable lock for releasably locking the vehicle hood mount to the second hinge member in the operating position such that the second hinge member and the vehicle hood mount move together for the raising and lowering movements of the vehicle hood member between the open and closed positions, the releasable lock being movable to a released position to permit the vehicle hood mount to move relative to the second hinge member between the operating and elevated positions; and a driving member movably connected to the first hinge member on the vehicle body;

said driving member being arranged to be moved by the actuator moving in the actuating direction so as to release the releasable lock and move vehicle hood mount from the operating position to the elevated position.

18. The assembly of claim 17, wherein the vehicle hood mount is releasably connected to the second hinge member at a first end thereof and is pivotably connected to second hinge member at a second end thereof so as to provide the movement of the vehicle hood mount relative to the second hinge member between the operating position and the elevated position.

19. The assembly of claim 17, wherein the driving member is pivotably connected to the first hinge member at a first end thereof and is movably connectable to the actuator at a second end thereof.

20. The assembly of claim 19, wherein the releasable lock includes a latch member constructed and arranged to move from a lock position to a release position and a bias member constructed and arranged to bias the latch member toward the lock position.

21. The assembly of claim 20, wherein the releasable lock includes a locking pin disposed on the second hinge member, the locking pin being constructed and arranged to engage with locking pin engaging portion disposed on the latch member to lock the vehicle hood mount to the second hinge member.

22. The assembly of claim 21, wherein a pivotal movement of the driving member about its first end causes a roller member disposed on the driving member to engage with a portion of the latch member and move the latch member from the lock position to the release position.

23. The assembly of claim 17, wherein the releasable lock includes a shear pin disposed on the second hinge member, the shear pin being constructed and arranged to engage with shear pin engaging portion disposed on the vehicle hood mount to lock the vehicle hood mount to the second hinge member in the operating position.

24. The assembly of claim 23, wherein a pivotal movement of the driving member about its first end causes a portion of the vehicle hood mount to engage with and to break off a portion of the shear pin so as to enable the movement of the vehicle hood mount from the operating position to the elevated position.

25. The assembly of claim 23, wherein a pivotal movement of the driving member about its first end causes a roller member disposed on the driving member to engage with a portion of the vehicle hood mount and move the vehicle hood mount from the operating position to the elevated position.

26. The assembly of claim 25, wherein the shear pin is sheared off by the shear pin engaging portion during the movement of the vehicle hood mount from the operating position to the elevated position.

27. The assembly of claim 26, wherein the shear pin engaging portion is constructed and arranged to assist in shearing or breaking off the shear pin.

28. The assembly of claim 17, wherein, in response to the impact detection signal, the driving member is arranged to be pushed by an outward movement of the actuator, thereby causing the driving member to pivot about its first end.

29. The assembly of claim 28, wherein a pivotal movement of the driving member about its first end causes a roller member disposed on the driving member to engage with and release the releasable lock so as to permit the vehicle hood mount move relative to the second hinge member from the operating position.

30. The assembly of claim 29, wherein the driving member is arranged to pivot upwardly by continued operation of the actuator such that the roller member disposed thereon contacts the vehicle hood mount moving it to its elevated position, whereby a vertical, upwardly motion is provided to the vehicle hood mount by an outwardly movement of the actuator.

* * * * *